July 26, 1927.
T. W. TURNER
COFFEE URN
Filed Sept. 1, 1926
1,637,286
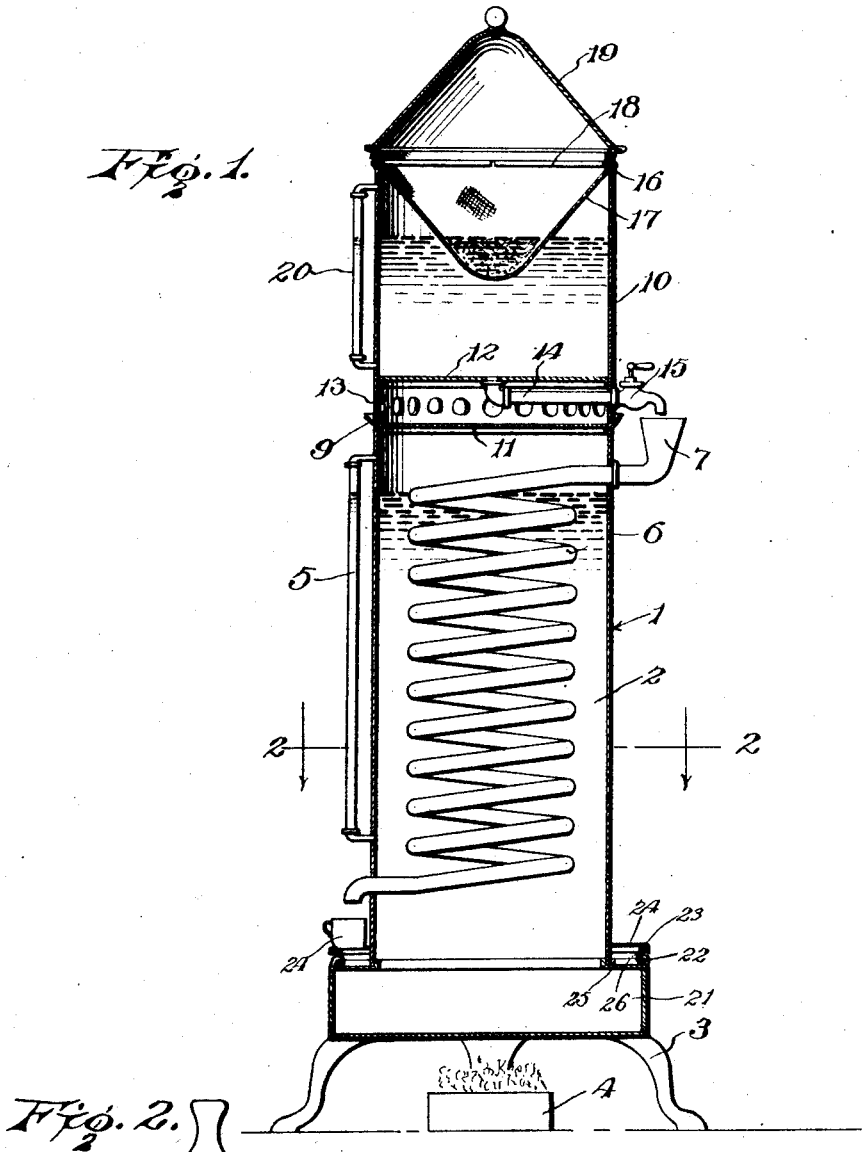
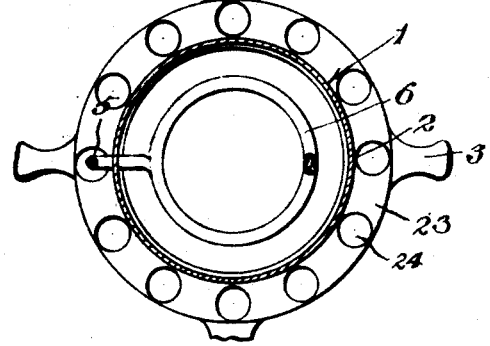
Inventor
T. W. Turner
By Lacey & Lacey, Attorneys Patented July 26, 1927.

1,637,286

UNITED STATES PATENT OFFICE.

THOMAS W. TURNER, OF NEWPORT NEWS, VIRGINIA.

COFFEE URN.

Application filed September 1, 1926. Serial No. 133,053.

This invention relates to improvements in coffee urns and has as its general object to provide a coffee urn which will possess material advantages over the urns which are in common use. Coffee urns, as ordinarily constructed, embody a container for the coffee to which heat is directly applied and the coffee infusion is maintained at a highly elevated degree of temperature for a long period of time. I have found that where coffee is subjected to heat for several hours it gradually loses its color and strength and becomes unpalatable. Therefore, the present invention has as its primary object to provide a coffee urn so constructed that the coffee drawn therefrom will possess maximum strength and a rich color, due to the fact that provision is made for delivering the coffee hot and yet not maintaining the same constantly at a high degree of temperature.

Another object of the invention is to provide a coffee urn so constructed that by its use, a material saving in the consumption of coffee will be effected and the coffee delivered therefrom will be in a highly desirable condition for consumption.

In the accompanying drawings:

Figure 1 is a vertical sectional view through the coffee urn embodying the invention.

Figure 2 is a horizontal sectional view taken substantially on the line 2—2 of Figure 1, looking in the direction indicated by the arrows.

The urn embodying the invention comprises a hot water container which is indicated in general by the numeral 1 and which preferably comprises a cylindrical body 2 of sheet metal or any other material found suitable for the purpose and supported in an elevated position by legs 3 to accommodate a heater 4 through the medium of which water within the container is maintained at an elevated degree of temperature. A water gauge 5 is preferably mounted upon the exterior of the chamber 1 and within the chamber there is arranged a pipe coil 6, the upper end of which extends through the wall of the chamber and is provided with a receiving funnel 7 which serves a purpose to be presently explained, the lower end of the coil being extended through the wall of the chamber near the bottom thereof and arranged to deliver coffee into a cup held therebelow.

The container or chamber 1 is open at its top and is provided with a seating shoulder 9, and a coffee reservoir 10 is disposed at its closed bottom upon this shoulder and in addition to its closed bottom, which is indicated by the numeral 11, is provided with a false bottom 12, the wall of the reservoir between the bottom 11 and false bottom 12 being formed with ventilating openings which are indicated by the numeral 13 and which provide for the circulation of air between the main and false bottoms so as to dissipate heat rising from the heating chamber 1. The coffee container has a delivery pipe 14 connected at one end to its bottom 12 and this pipe leads through the wall of the chamber between the bottom 11 and the false bottom 12 and communicates with a manually controlled cut-off valve 15, the delivery end of the casing of which is positioned directly above the funnel 7, so that by manipulating the valve, coffee may be delivered from the reservoir 10 into the funnel and thence into the pipe coil 6.

The coffee reservoir 10 is provided at its open top with an annular seat 16 in which is engaged the margin of a foraminous bag 17 to contain the pulverized coffee and this bag is retained in place by a resilient split ring 18 which engages the said margin and confines the same in the seat 16. The reservoir is provided with a removable cover 19 so that coffee, already prepared, may be introduced into the reservoir, the fluid and dreg constituents of the coffee being both introduced into the reservoir and the fluid constituent draining through the bag 17, leaving the dregs in the said bag. A level gauge 20 is preferably provided upon the exterior of the reservoir 10 so that the quantity of fluid coffee therein may be readily ascertained.

The base member 21 of the container 1 is of greater diameter than the upper body thereof, as shown clearly in Fig. 1, and at the margin of the base member are one or more overhanging lugs. Encircling the lower end of the container and supported by the base member is a rack consisting of a flat annulus having openings 24 each adapted to receive a cup, as indicated at 24. A base ring 25, connected with the rack by feet 26, carries the rack and engages under the lugs 22 so that it will be held to the base member 21 thereby and may rotate about the cylindrical body of the container. The provision of this rack facilitates the filling of several cups in succession and, by maintaining a plurality of cups in proximity to the container, raises the temperature of the cups so that chilling of the coffee by contact therewith is avoided.

From the foregoing description of the invention, it will be observed that, unlike the common practice, coffee already prepared is introduced into the container 10 and permitted to remain therein until delivered from the spout 15 into the coil 6, being nearly at atmospheric temperature and therefore maintaining its full strength and color. It will also be evident from the foregoing description that by opening the valve 15 and permitting the fluid coffee to flow through the coil 6, the coffee is instantly heated and will issue hot from the coil so that a supply of hot coffee is always available without the disadvantages attending the maintenance of the coffee at a constantly elevated temperature.

Having thus described the invention, I claim:

1. In a coffee urn, a heating chamber, a coil therein, a coffee reservoir supported upon the said chamber, an air ventilated chamber between the heating chamber and the reservoir, and means mounted in the air ventilated chamber for delivering coffee from the reservoir to the coil.

2. In a coffee urn, a base, a heating chamber on the base, a coffee reservoir supported on the chamber, a coil in the heating chamber, said coil serving to conduct coffee from the reservoir through the heating chamber, and having its discharge end disposed adjacent the base, a rack for supporting a plurality of cups, said rack encircling the heating chamber and rotatable on the base for successively positioning cups carried thereby under the discharge end of the coil.

In testimony whereof I affix my signature.

THOMAS W. TURNER. [L. S.]